(12) United States Patent
White et al.

(10) Patent No.: US 11,404,740 B2
(45) Date of Patent: Aug. 2, 2022

(54) SIDE IMPACT PROTECTION OF BATTERY ENCLOSURES

(71) Applicant: GM GLOBAL TECHNOLOGY OPERATIONS LLC, Detroit, MI (US)

(72) Inventors: Andrew W. White, Shelby Township, MI (US); Terry A. Swartzell, Ann Arbor, MI (US); James A. Rochon, Shelby Township, MI (US); Mark T. Dingman, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 327 days.

(21) Appl. No.: 16/711,636

(22) Filed: Dec. 12, 2019

(65) Prior Publication Data
US 2021/0184192 A1 Jun. 17, 2021

(51) Int. Cl.
| | |
|---|---|
| *H01M 50/20* | (2021.01) |
| *B60R 16/04* | (2006.01) |
| *H01M 50/242* | (2021.01) |
| *H01M 50/249* | (2021.01) |
| *H01M 50/271* | (2021.01) |
| *H01M 50/291* | (2021.01) |

(52) U.S. Cl.
CPC ............. *H01M 50/20* (2021.01); *B60R 16/04* (2013.01); *H01M 50/242* (2021.01); *H01M 50/249* (2021.01); *H01M 50/271* (2021.01); *H01M 50/291* (2021.01)

(58) Field of Classification Search
None
See application file for complete search history.

(56) References Cited

U.S. PATENT DOCUMENTS

| | | | |
|---|---|---|---|
| 10,494,030 B1* | 12/2019 | Paramasivam | ........ B62D 25/20 |
| 2009/0145676 A1* | 6/2009 | Takasaki | ............... H01M 50/20 180/65.1 |
| 2013/0068548 A1* | 3/2013 | Akazawa | ............... H01M 50/20 180/68.5 |
| 2013/0192914 A1* | 8/2013 | Nakamori | ............. H01M 50/20 180/68.5 |
| 2017/0355255 A1* | 12/2017 | Brausse | ............... B62D 27/023 |

* cited by examiner

*Primary Examiner* — Gregg Cantelmo
(74) *Attorney, Agent, or Firm* — Cantor Colburn LLP

(57) ABSTRACT

A system for protecting a battery enclosure of a vehicle, comprising of a structural blocker configured to be fixedly attached to a side portion of the battery enclosure. The side portion faces a lateral direction, extending along a vehicle axis that extends between a front and a rear of a vehicle. The battery enclosure includes at least one cross member oriented along a lateral direction, wherein the structural blocker is configured to be aligned with an end of the cross member and localized to a region of the side portion proximate to the end of the cross member. The structural blocker is configured to transfer a side load from a structural component of the vehicle to the cross member.

13 Claims, 7 Drawing Sheets

SIDE IMPACT PROTECTION OF BATTERY ENCLOSURES

INTRODUCTION

The subject disclosure relates to an electric vehicle battery enclosure. Specifically, the subject disclosure relates to structures and devices for protection of electric vehicle batteries from side impacts.

Electric vehicle batteries (EVBs) provide motive power in vehicles that utilize electric motors. Such vehicles include in all electric or hybrid electric vehicles. The EVBs are a pack of two or more batteries (e.g., lithium-ion batteries), each of which may include several hundred individual battery cells. EVBs are stored in a sealed enclosure to protect the battery cells from damage and debris, and to contain the heat and gasses produced by the EVBs. Among the challenges presented in designing effective battery enclosures is protection of the batteries from side impacts, including side pole impacts. Accordingly, it is desirable to provide a vehicle battery enclosure assembly that provides effective protection of batteries from side impacts.

SUMMARY

In one exemplary embodiment, a system for protecting a battery enclosure of a vehicle, comprising of a structural blocker configured to be fixedly attached to a side portion of the battery enclosure. The side portion faces a lateral direction, extending along a vehicle axis that extends between a front and a rear of a vehicle. The battery enclosure includes at least one cross member oriented along a lateral direction, wherein the structural blocker is configured to be aligned with an end of the cross member and localized to a region of the side portion proximate to the end of the cross member. The structural blocker is configured to transfer a side load from a structural component of the vehicle to the cross member.

In addition to one or more of the features described herein, the structural blocker includes a surface located laterally outwardly from the side portion, the surface configured to face the structural component of the vehicle.

In addition to one or more of the features described herein, the structural blocker includes a facing section located laterally outwardly from the side portion of the battery enclosure, the facing section configured to face the structural component of the vehicle.

In addition to one or more of the features described herein, the facing section is a vertical surface perpendicular to the lateral direction.

In addition to one or more of the features described herein, the facing section has a width in a direction parallel to the vehicle axis, the width being about equal to or less than a width of an end of the cross member.

In addition to one or more of the features described herein, the side portion of the battery enclosure has a side surface that angles laterally inwardly, the side surface defining a draft angle relative to the lateral direction.

In addition to one or more of the features described herein, the structural blocker includes first sections attached to the tapered side surface, and a facing section that extends laterally outwardly from the side portion of the battery enclosure. The facing section defines a vertical surface facing the structural component of the vehicle.

In addition to one or more of the features described herein, the battery enclosure includes a plurality of cross members, and the system includes a plurality of the structural blockers, each structural blocker of the plurality of structural blockers aligned with an end of a respective cross member.

In addition to one or more of the features described herein, the structural component includes at least one of a frame of the battery enclosure and a vehicle rocker panel.

In addition to one or more of the features described herein, the vehicle is selected from a fully electric vehicle and a hybrid vehicle.

In another exemplary embodiment, a method of protecting one or more electric batteries in a battery enclosure of a vehicle, comprises receiving a side load on a vehicle including a battery enclosure, the battery enclosure including a side portion facing a lateral direction of the vehicle and extending along a vehicle axis that extends between a front and a rear of a vehicle. The battery enclosure includes at least one cross member oriented in the lateral direction. Transferring a part of the side load from a structural component of the vehicle to a structural blocker fixedly attached to the side portion. The structural blocker is aligned with an end of the cross member and localized to a region of the side portion proximate to the end of the cross member. Transferring the part of the side load via the structural blocker to the cross member.

In addition to one or more of the features described herein, the structural blocker includes a facing section located laterally outwardly from the side portion. The facing section faces the structural component of the vehicle.

In addition to one or more of the features described herein, the facing section is a vertical surface perpendicular to the lateral direction.

In addition to one or more of the features described herein, the facing section has a width in a direction parallel to the vehicle axis. The width is about equal to or less than a width of an end of the cross member.

In addition to one or more of the features described herein, the side portion has a side surface that angles laterally inwardly. The side surface defines a draft angle relative to the lateral direction.

In addition to one or more of the features described herein, the structural blocker includes a first section attached to the angled side surface, and a facing section extending laterally outwardly the facing section defines a vertical surface facing the structural component of the vehicle.

In yet another exemplary embodiment, a vehicle system comprises a battery enclosure configured to house one or more batteries. The battery enclosure has a side portion facing a lateral direction and extending along a vehicle axis that extends between a front and a rear of a vehicle. The battery enclosure includes at least one cross member oriented in a lateral direction. A structural blocker is configured to be fixedly attached to the side portion, aligned with an end of the cross member and localized to a region of the side portion proximate to the end of the cross member. The structural blocker is configured to transfer a side load from a structural component of the vehicle to the cross member.

In addition to one or more of the features described herein, the structural blocker includes a facing section located laterally outwardly from the side portion. The facing section faces the structural component of the vehicle.

The vehicle system of claim 17, wherein the facing section has a width in a direction parallel to the vehicle axis, the width being about equal to or less than a width of an end of the cross member.

In addition to one or more of the features described herein, the side portion has a side surface that angles laterally inwardly. The side surface defines a draft angle relative to the lateral direction and the structural blocker includes a first section attached to the angled side surface. A facing section extends laterally outwardly defining a vertical surface facing the structural component of the vehicle.

In addition to one or more of the features described herein, the battery enclosure includes a plurality of cross member and the vehicle system includes a plurality of the structural blockers. Each structural blocker of the plurality of structural blockers is aligned with an end of a respective cross member.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
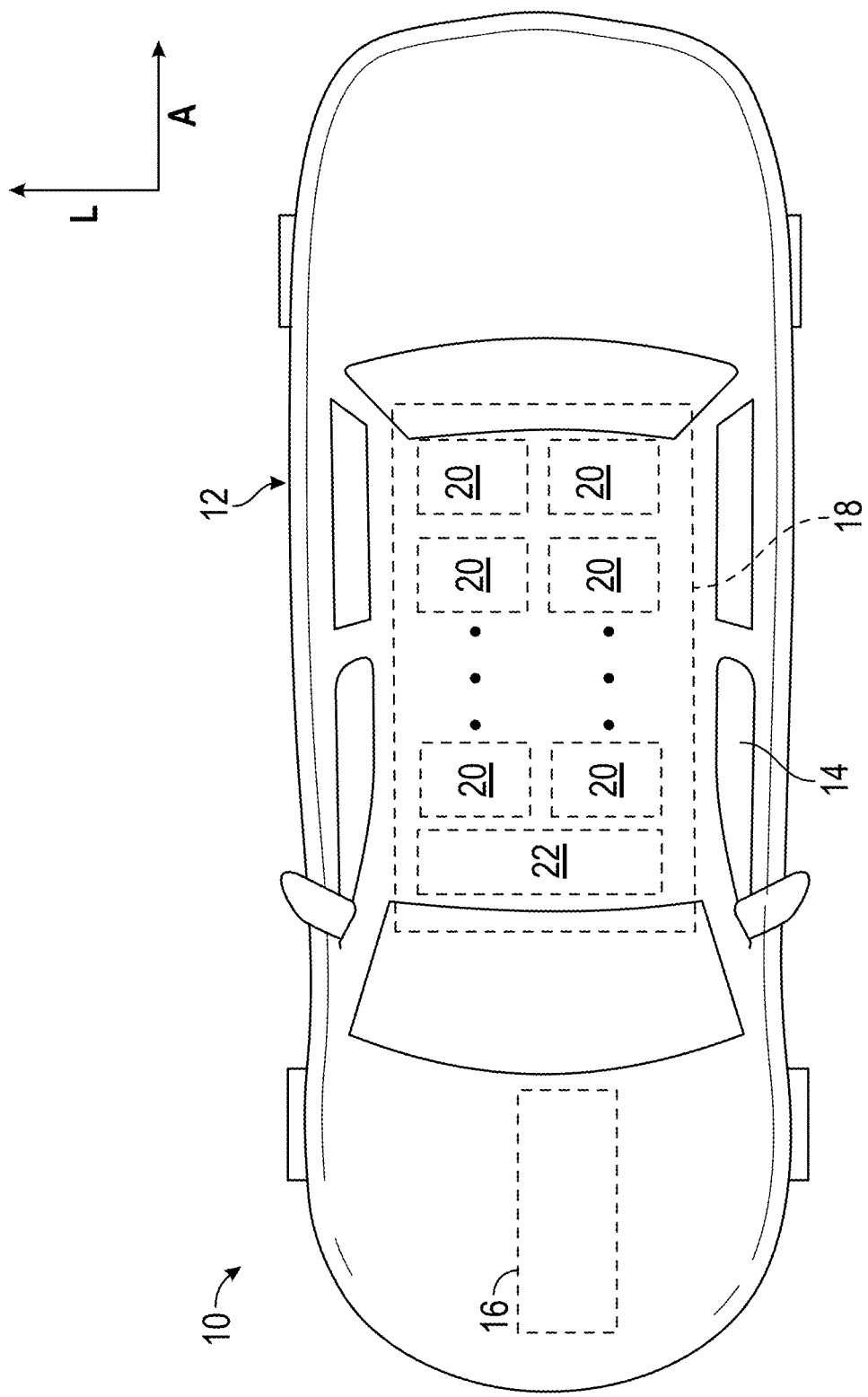
FIG. 1 is a top view of an electric motor vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, systems, devices and methods for protection of a battery enclosure are described herein. An embodiment of a battery enclosure includes a support structure such as a battery tray, and one or more cross members oriented in a lateral direction. A "lateral direction" refers to a direction at least partially perpendicular to a front-to-rear direction of a vehicle. A localized structural blocker is disposed proximate to an end of a cross member and aligned with the cross member. Each blocker is configured to provide a structural load path to a respective cross member and to transfer side loads on the vehicle to the cross member, and away from battery modules.

An embodiment of a battery enclosure includes a cover portion and a tray portion or lower portion. A plurality of cross members each extend laterally and define chambers that each house a battery module. For a given cross member, structural blockers may be disposed on both sides of the battery enclosure at positions that align with the cross member. Structural blockers may be steel (e.g., stamped steel) components that, when attached to the side portions of the battery enclosure, extend laterally away from the enclosure. If a side load is applied to the vehicle structure, each blocker receives part of the load and transfers the received load to a respective cross member.

In one embodiment, the side portions of the battery enclosure define tapered surfaces that taper inwardly at a selected angle relative to a vertical axis. This configuration provides additional space (e.g., crush space) for displacement of structural features of the vehicle, as compared to a vertical side portion.

Embodiments described herein present several advantages. A battery enclosure having structural blockers aligned with cross members as described herein provides effective protection of battery modules by ensuring that side loads are applied to the cross members and not to the battery compartments or batteries themselves. In addition, the blockers and the battery enclosures described herein maximize crush space, or at least increase crush space to reduce or minimize the intrusion of deforming structures into a battery space, and thereby provide additional protection. This allows for increasing the size of battery modules and thereby providing more range.

FIG. 1 shows an embodiment of an electric motor vehicle 10, which includes a vehicle body 12 defining, at least in part, an occupant compartment 14. The vehicle 10 can be, for example, a fully electric vehicle (all motive force provided by an electric motor or motors) or a hybrid vehicle. The vehicle body 12 supports various vehicle subsystems including an engine assembly 16, which includes at least one electric motor and may also include a combustion engine.

The vehicle 10 also includes a battery enclosure 18 that holds a plurality of battery modules 20. Each battery module may include a single battery or a plurality of batteries. It is noted that the enclosure 18 is not limited to the configuration of FIG. 1, as the enclosure may hold any number or type of battery. It is also noted that the enclosure is not limited to the shape, size and vehicle position shown in FIG. 1.

The vehicle 10 may include other components that are not shown or detailed herein. For example, the vehicle 10 may include one or more sensors (e.g., radar system, lidar system, camera) that obtain information about the vehicle 10 and its environment. The vehicle 10 may also include controllers and/or other components 22 that facilitate autonomous or semi-autonomous operation and, additionally, monitor the battery modules and other components.

Figure 2:
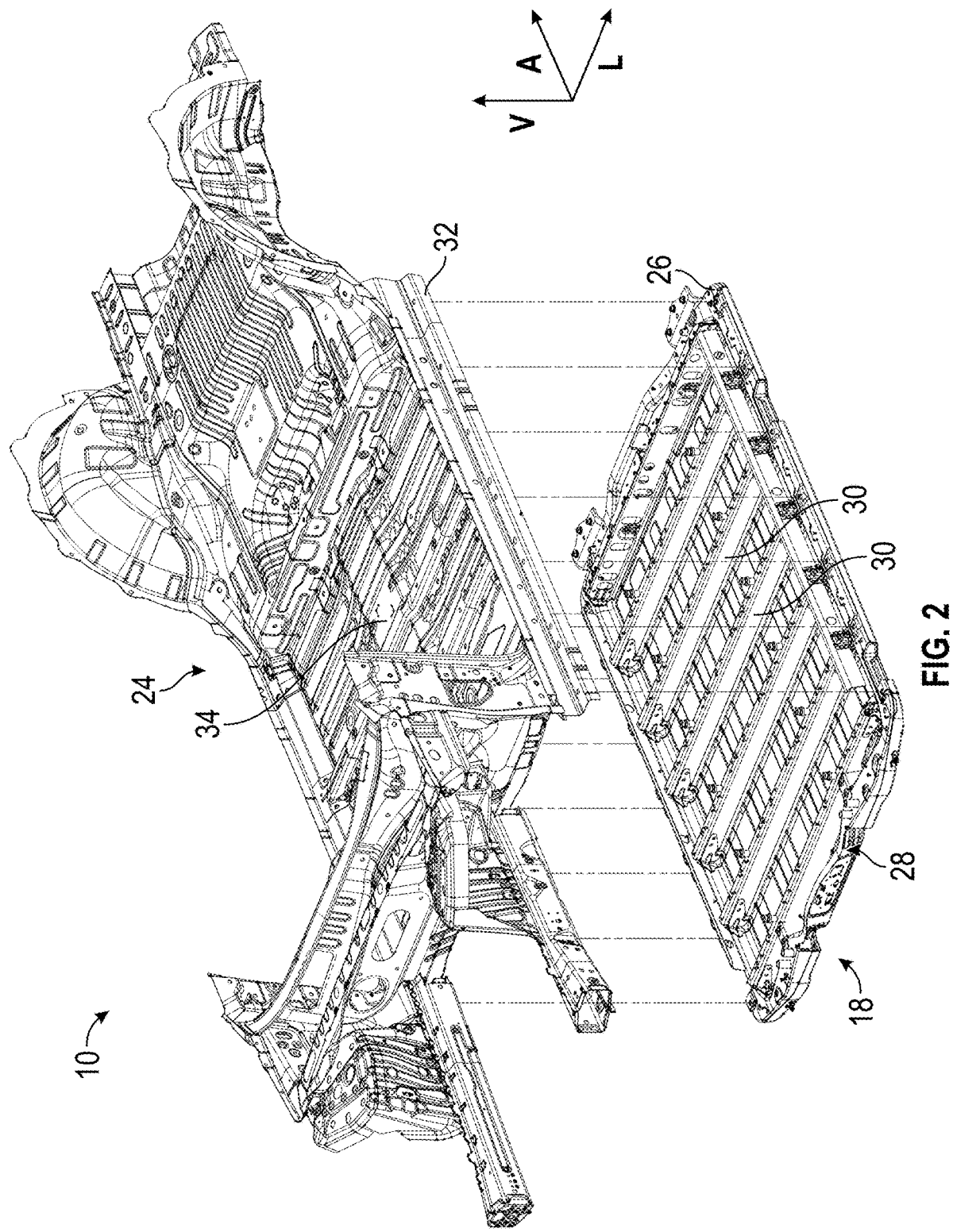
FIG. 2 depicts an example of a frame and a battery enclosure of the vehicle of FIG. 1, in accordance with an exemplary embodiment.

Referring to FIG. 2, the vehicle 10 includes components of a chassis structure 24 (the chassis structure may include a uni-body structure, a body on frame structure and I-Beam structure or any suitable vehicle structure known in the art of vehicle design) that is attached to the battery enclosure 18 (only the lower portion of which is shown in FIG. 2). The battery enclosure 18 includes a lower portion, referred to herein as a tray portion 26. The tray portion 26 includes a battery housing structure 28 and a plurality of cross members 30 that extend in a lateral direction between the sides thereof. A "lateral direction" refers to a direction at least substantially perpendicular to a longitudinal axis A of the vehicle 10. The lateral direction is parallel to the lateral axis L.

In one embodiment, the chassis structure 24 includes a rocker panel 32 attached to a floor pan 34. The rocker panel 32 generally extends between front and rear portions of the chassis structure 24 and provides structural reinforcement to the chassis structure 24.

Figure 3:
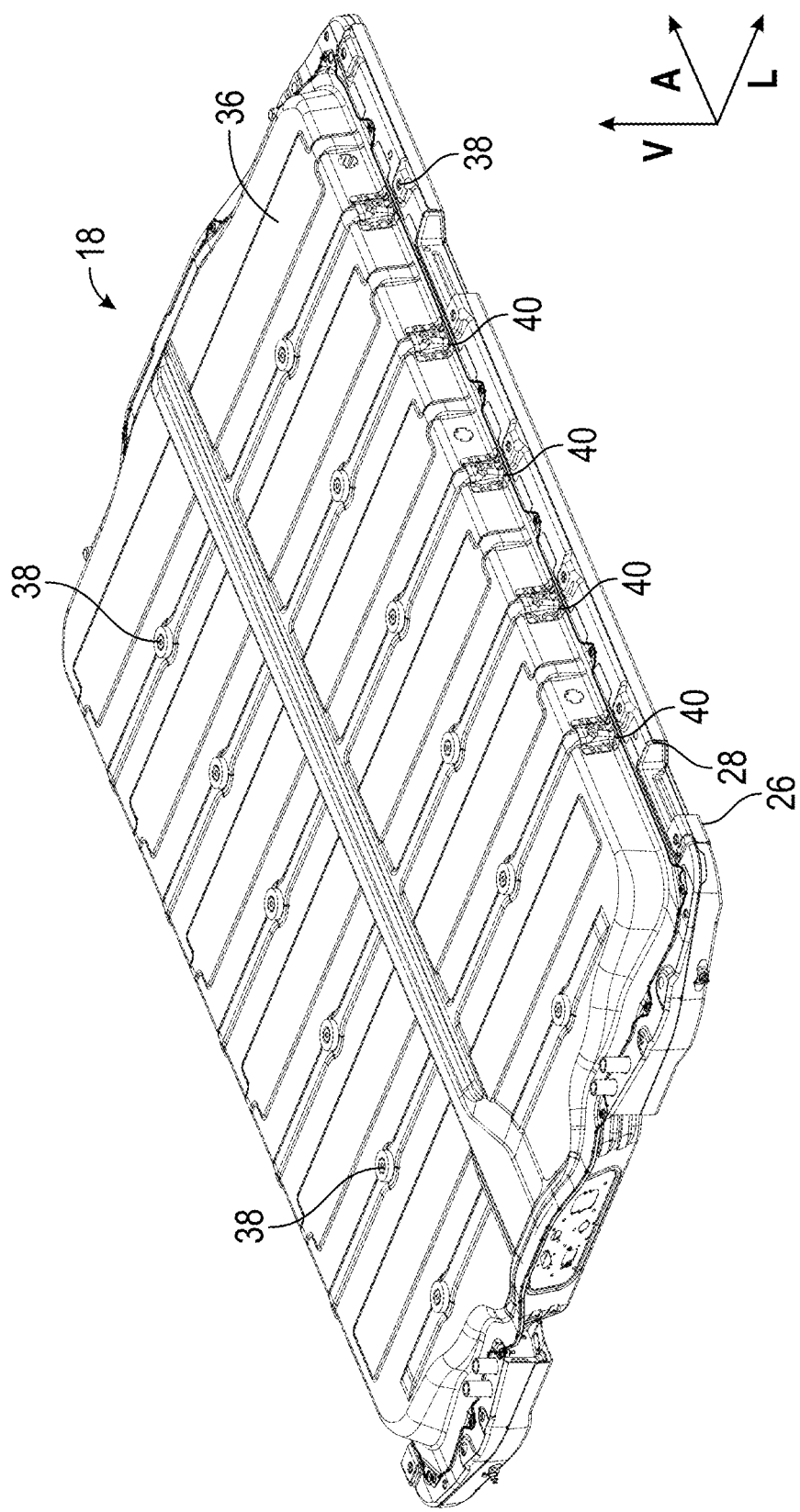
FIG. 3 depicts an example of a battery enclosure, in accordance with an exemplary embodiment.
Figure 4:
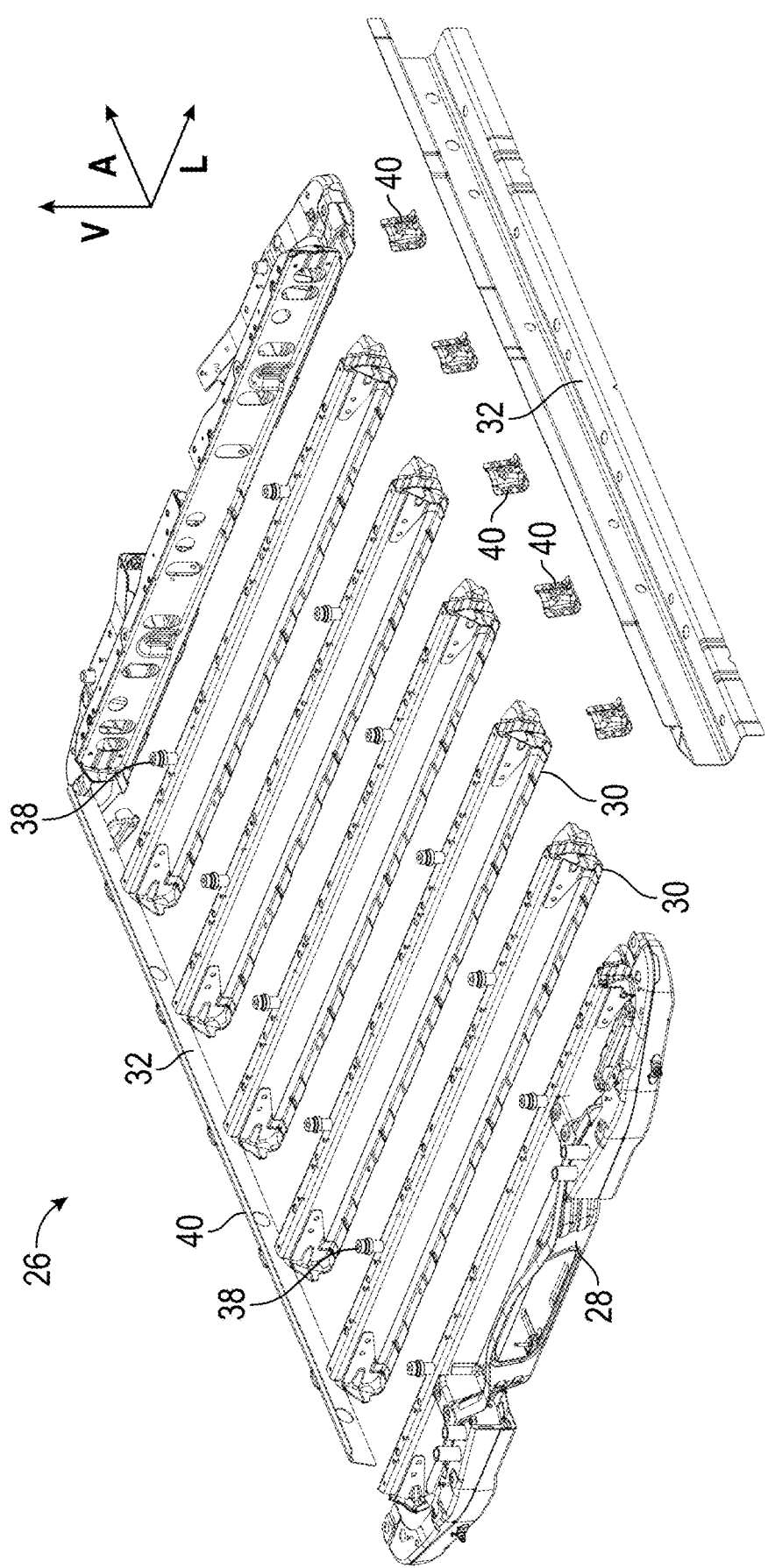
FIG. 4 is a disassembled view of a tray portion of the battery enclosure of FIG. 3, in accordance with an exemplary embodiment.

FIG. 3 depicts an example of an assembled battery enclosure 18, and FIG. 4 is a partially disassembled view of the tray portion 26 of the battery enclosure 18. In this example, the battery enclosure includes a cover portion 36 that is connected to the tray portion 26. The tray portion 26 and the cover portion 36 are connected via a sealant, mechanical fasteners or other mechanism to form a fluid-tight enclosure around enclosed batteries. The cover portion 36 may be integral with the chassis structure 24, or as shown in FIG. 3, may be a separate component that is sealed against the tray portion to form a self-contained enclosure. The enclosure 18, in this example, may be attached to the chassis structure 24 using bolts or other mechanical fasteners that engage attachment features 38.

The battery enclosure 18 includes one or more blocking components configured to engage the rocker panel 32 or other structural component of the vehicle 10, to transfer side loads to the cross members 30, thereby providing load protection to the battery enclosure 18 and the batteries disposed therein. FIG. 3 shows a plurality of blocking components, referred to herein as structural blockers 40, that are attached to the cover portion 36. Each blocker 40 is aligned with a respective cross member 30, (i.e., an end of the cross member 30 and a respective blocker 40 are located at the same or similar axial location). Each blocker 40 is located proximate to an end of a cross member 30, such that the blocker 40 is close enough to effectively transfer side loads on the chassis structure to the blocker 40 and, subsequently, to the cross member 30.

Figure 5:
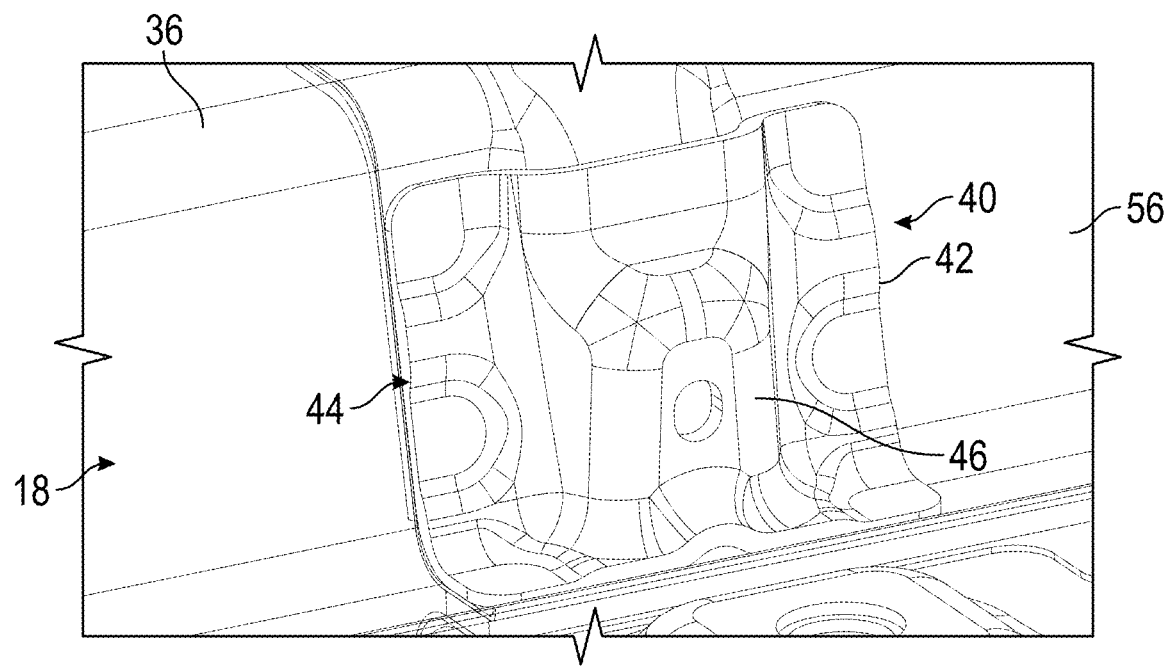
FIG. 5 depicts a structural blocker configured to protect a battery enclosure, in accordance with an exemplary embodiment.
Figure 6:
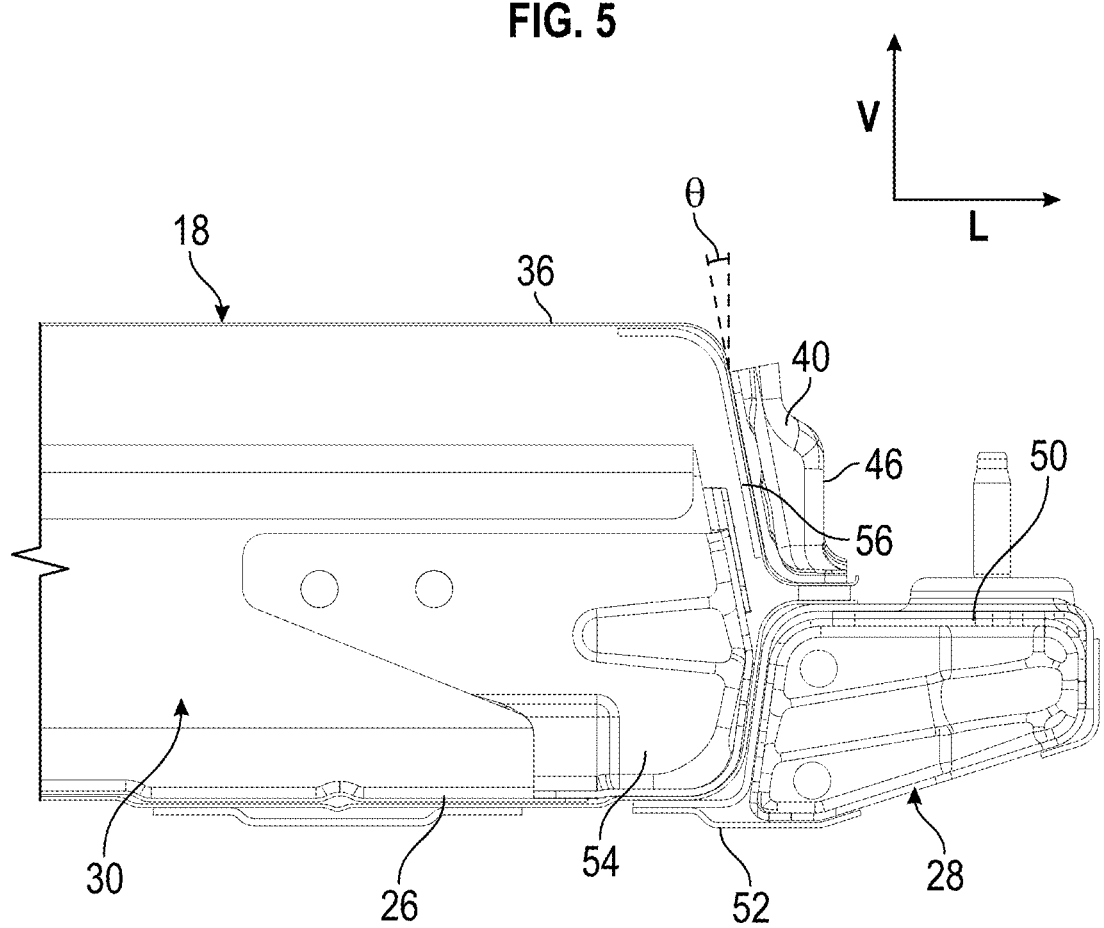
FIG. 6 is a cross-sectional view of the blocker of FIG. 5 in combination with a battery enclosure and a frame, in accordance with an exemplary embodiment.
Figure 8:
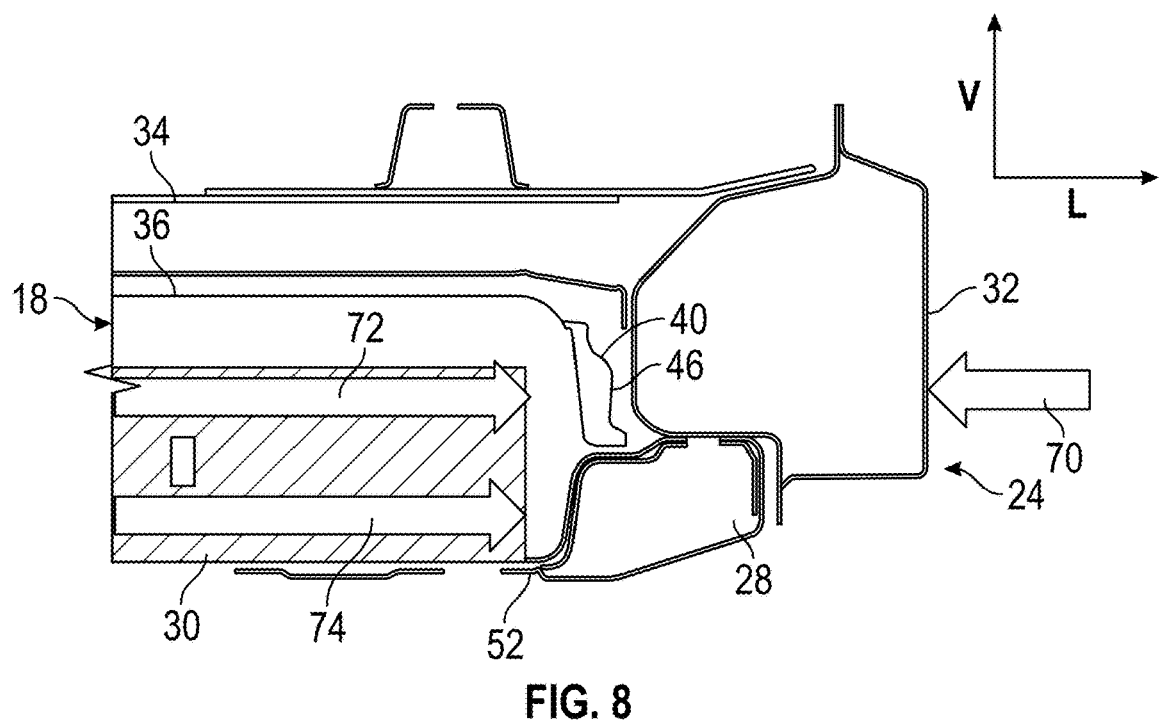
FIG. 8 depicts the battery enclosure and vehicle frame of FIG. 6 and depicts aspects of a method of protecting a battery enclosure and transferring side loads to cross members, in accordance with an exemplary embodiment.

FIGS. 5, 6 and 8 depict an embodiment of the blocker 40 and show an embodiment of the blocker 40 relative to the battery enclosure 18, the battery structure 28 and the vehicle structure 24. FIG. 5 is a perspective view of the blocker 40, and FIGS. 6 and 8 are cross-sectional views of a portion of the battery enclosure 18, the battery structure 28 and the chassis structure 24. In this embodiment, the blocker 40 (made of stamped steel, for example) includes first sections 42, 44 (also referred to as attachment sections) that attach to the cover portion 36. The blocker 40 is not so limited, as it may be an integral part of the cover portion 36.

The blocker 40 further includes a second section 46 (also referred to as a facing section) that is configured to contact or otherwise engage a deforming component such as the rocker panel 32 when a sufficient side load is applied (e.g., in a crash). In one embodiment, the second section 46 defines a surface that faces in a lateral direction, (i.e., forms a plane that is perpendicular (or at least partially perpendicular) to the lateral axis L). The plane formed by the facing surface of the second section 46 in this embodiment is a vertical plane, (i.e., parallel to a vertical axis V).

Referring to FIG. 6, an embodiment of the battery enclosure 18 includes the plurality of cross members 30. A blocker 40 is disposed adjacent both ends of each cross member 30. The battery structure 28 includes a frame 50 having a frame reinforcement component 52.

As shown, the end of the cross member 30 abuts the frame reinforcement 52 and provides a continuous cross car load path from the outside of the battery enclosure 18 to the cross member 30. The cross member 30 may also be reinforced.

For example, a cross member reinforcement component 54 may be attached to the ends of each cross member 30 to provide additional.

The cover portion 36 includes a side portion that generally faces a lateral direction. The side portion defines a side surface 56 that may have any suitable shape or size. For example, the side surface 56 may be a vertical surface (parallel to the vertical axis V) or an angled surface.

In one embodiment, the side surface 56 is an angled surface that angles inwardly, (i.e., away from the vehicle exterior and toward the interior of the battery enclosure 18). The angled side surface 56 defines a draft angle $\theta$ relative to the vertical axis V. The draft angle $\theta$ may have any suitable value between zero and 90 degrees and can be selected based on considerations such as space and chassis structure or frame configuration. The draft angle $\theta$ provides an increase in crush space as compare with a vertical side surface 56.

Figure 7:
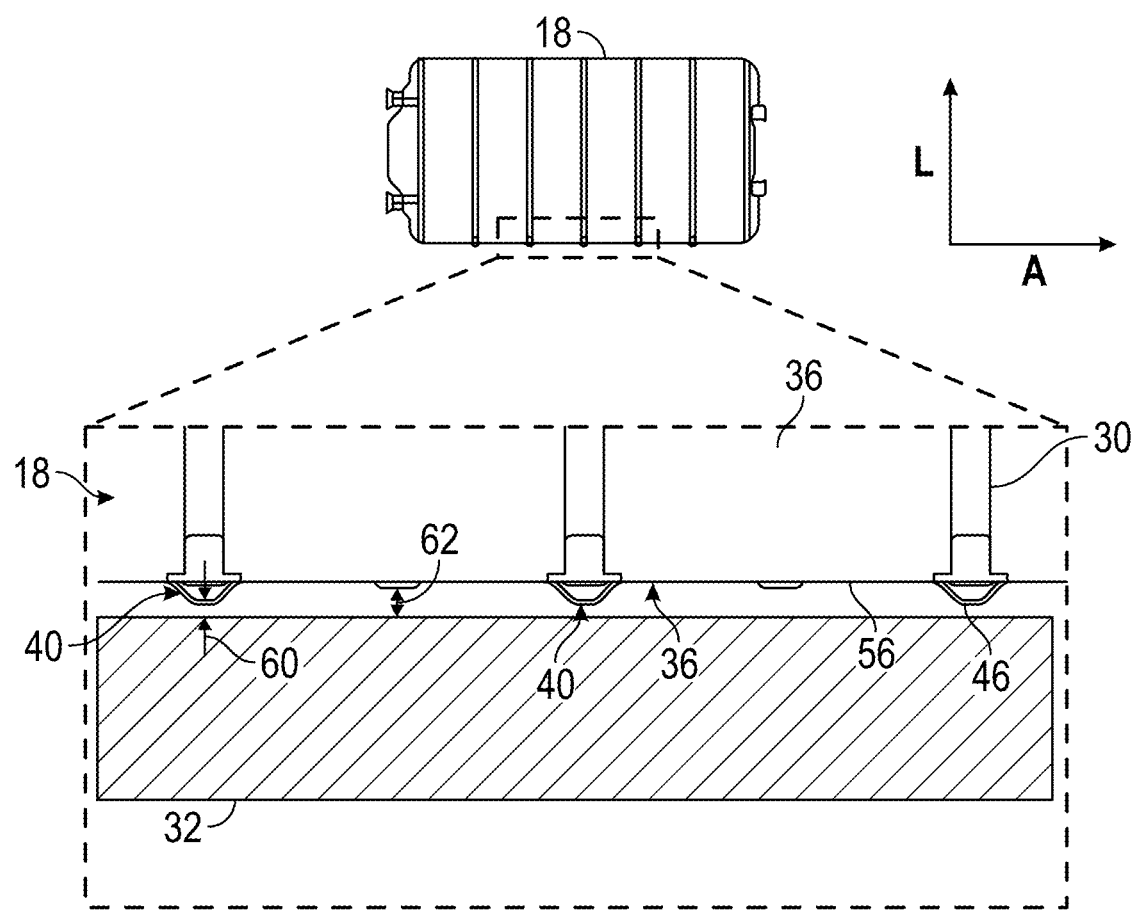
FIG. 7 depicts a battery enclosure including a plurality of cross members and a plurality of localized structural blockers proximate to each cross member, in accordance with an exemplary embodiment.

FIG. 7 includes a top view of an embodiment of the battery enclosure 18 and a cross-section of an embodiment of part of the battery enclosure 18 and the rocker panel 32. A blocker 40 is attached to the cover portion 36 on the angled side surface 56. In one embodiment, a blocker 40 is attached proximate to both ends of each cross member 30. As shown, the blockers 40 are configured so that the second section 46 of each blocker extends laterally a selected distance from side surface 56. The distance is selected so that, when the battery enclosure 18 is assembled and incorporated into the vehicle chassis structure 24, a minimum gap or space 60 between the rocker panel 32 and the blockers 40 is established. The minimum space is designed to facilitate load transfer and manufacturability of the battery enclosure 18 to the vehicle 10 as further described herein.

Each blocker 40 is localized to a cross member end. For example, the facing section 46 of each blocker has a width selected to facilitate localizing lateral side loads on the battery enclosure 18 so that the load is focused onto the cross member 30. The width of the facing section 46 is, for example, approximately equal to a width of the end of the cross member 30. It is noted that the width of facing section 46 is not so limited, as it may be designed to be greater, equal or less than the width of the cross member 30.

In one embodiment, the blockers 40 are configured to facilitate the establishment and maintenance of a crush space 62 between the battery enclosure 18 and the rocker panel 32 (or other structural component). As shown in FIG. 7, in addition to facilitating load transfer at the cross members 30, this configuration of localized blockers 40 maximizes the available crush space. For example, the crush space 62 between consecutive blockers 40 is not reduced by the presence of any additional structures, bodies or features, and is limited only by the relative positions of the battery enclosure 18 and the rocker panel 32.

Figure 9:
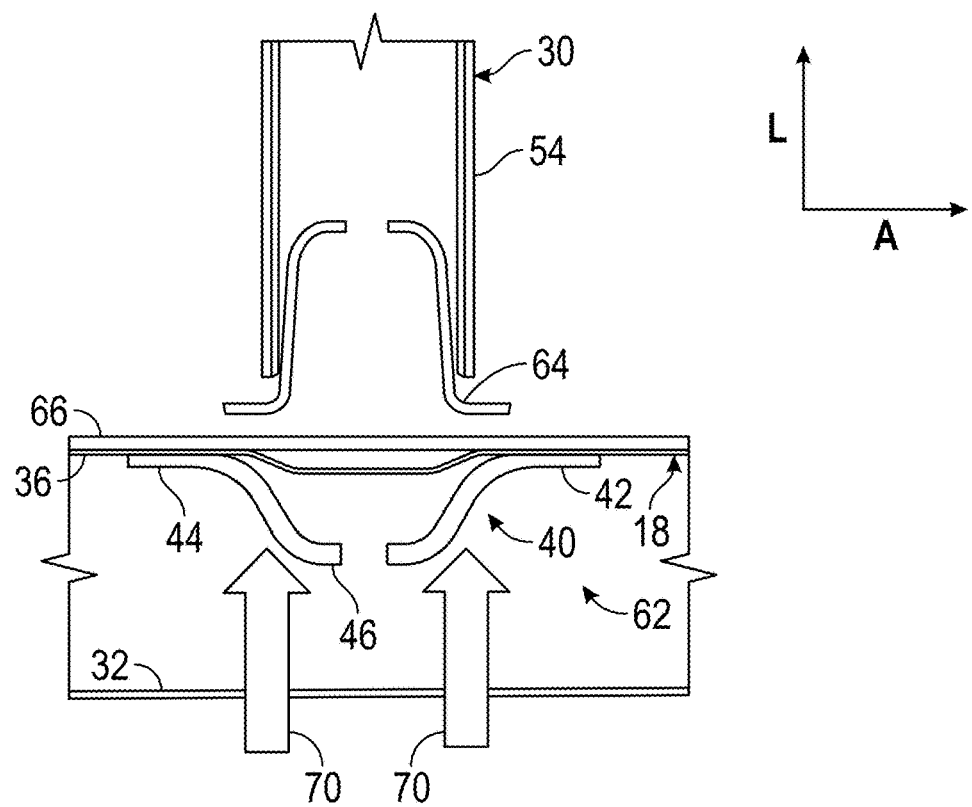
FIG. 9 depicts the battery enclosure of FIG. 7 and depicts aspects of a method of protecting a battery enclosure and transferring side loads to cross members, in accordance with an exemplary embodiment.

FIGS. 8 and 9 also depict aspects of an example of a method of protecting a battery enclosure, such as the battery enclosure 18. The method utilizes the battery enclosure's side structure 28 and/or localized structural blockers 40 for localized load transfer between a vehicle body structure 32 and battery structural cross members 30.

In this example, as shown in FIG. 9, the cross member 30 includes a reinforcement 54, and is attached to a stabilizer 64. The cover portion 36 also has a reinforcement component 66 attached thereto.

A lower load path is provided by the battery frame 26 and the cross member 30. The structural blocker 40 provides an additional load path, referred to as an upper load path, which causes lateral forces 70, on the rocker panel 32 for instance, to be localized at the cross member 30 and reduces forces on battery modules.

In this example, a side load 70 (i.e., a load having a directional component parallel to the lateral axis L) is applied to the rocker panel 32 of the vehicle chassis structure 24, as a result of, for example, a collision (e.g., with a pole or other object, or with another vehicle). Although the method is discussed in conjunction with a pole load, the method can be performed in response to other side or lateral loads.

The side load 70 impinges on the chassis structure 32 and may deform parts of the battery frame 28, the rocker panel 32 or other structure. Deformation of the structure causes it to move inwardly and engage the facing, second section 46 of the blocker 40. The blocker 40 in turn transfers the load thereon to the cross member 30.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed but will include all embodiments falling within the scope thereof.

What is claimed is:

1. A system for protecting a battery enclosure of a vehicle, comprising:
    a structural blocker configured to be fixedly attached to a side portion of the battery enclosure, the side portion facing a lateral direction and extending along a vehicle axis that extends between a front and a rear of a vehicle, the battery enclosure including a cross member oriented in a lateral direction, wherein:
    the structural blocker is configured to be aligned with an end of the cross member and localized to a region of the side portion of the battery enclosure proximate to the end of the cross member, the structural blocker configured to transfer a side load from a structural component of the vehicle to the cross member; and
    the structural blocker includes a facing section located laterally outwardly from the side portion of the battery enclosure, the facing section configured to face the structural component of the vehicle, the facing section having a width in a direction parallel to the vehicle axis, the width being about equal to or less than a width of an end of the cross member.

2. The system of claim 1, wherein the facing section is a vertical surface perpendicular to the lateral direction.

3. The system of claim 1, wherein the side portion of the battery enclosure has a side surface that angles laterally inwardly, the side surface defining a draft angle relative to the lateral direction.

4. The system of claim 3, wherein the structural blocker includes first sections attached to the angled side surface, and a facing section extends laterally outwardly from the side portion of the battery enclosure, the facing section defining a vertical surface facing the structural component of the vehicle.

5. The system of claim 1, wherein the battery enclosure includes a plurality of cross members, and the system includes a plurality of structural blockers including the structural blocker, each structural blocker of the plurality of structural blockers aligned with an end of a respective cross member.

6. The system of claim 1, wherein the structural blocker is configured to transfer a side load from at least one of a frame of the battery enclosure and a vehicle rocker panel.

7. A method of protecting one or more electric batteries in a battery enclosure of a vehicle, comprising:
    receiving a side load on a vehicle including a battery enclosure, the battery enclosure including a side portion facing a lateral direction of the vehicle and extending along a vehicle axis that extends between a front and a rear of a vehicle, the battery enclosure including a cross member oriented in the lateral direction; and
    transferring a part of the side load from a structural component of the vehicle to a structural blocker fixedly attached to the side portion, the structural blocker aligned with an end of the cross member and localized to a region of the side portion proximate to the end of the cross member, the structural blocker including a facing section located laterally outwardly from the side portion of the battery enclosure, the facing section configured to face the structural component of the vehicle, the facing section having a width in a direction parallel to the vehicle axis, the width being about equal to or less than a width of an end of the cross member; and
    transferring the part of the side load via the structural blocker to the cross member.

8. The method of claim 7, wherein the facing section is a vertical surface perpendicular to the lateral direction.

9. The method of claim 7, wherein the side portion has a side surface that angles laterally inwardly, the side surface defining a draft angle relative to the lateral direction.

10. The method of claim 9, wherein the structural blocker includes a first section attached to the angled side surface, and a facing section extending laterally outwardly, the facing section defining a vertical surface facing the structural component of the vehicle.

11. A vehicle system comprising:
    a battery enclosure disposed in a vehicle and configured to house one or more batteries, the battery enclosure having a side portion, the side portion facing a lateral direction and extending along a vehicle axis that extends between a front and a rear of a vehicle, the battery enclosure including a cross member oriented in a lateral direction; and
    a structural blocker configured to be fixedly attached to the side portion, the structural blocker aligned with an end of the cross member and localized to a region of the side portion proximate to the end of the cross member, the structural blocker configured to transfer a side load from a structural component of the vehicle to the cross member, the structural blocker including a facing section located laterally outwardly from the side portion of the battery enclosure, the facing section configured to face the structural component of the vehicle, the facing section having a width in a direction parallel to the vehicle axis, the width being about equal to or less than a width of an end of the cross member.

12. The vehicle system of claim 11, wherein the side portion has a side surface that angles laterally inwardly, the side surface defining a draft angle relative to the lateral direction and the structural blocker includes a first section attached to the angled side surface, and a facing section extending laterally outwardly, the facing section defining a vertical surface facing the structural component of the vehicle.

13. The vehicle system of claim 11, wherein the battery enclosure includes a plurality of cross members, and the vehicle system includes a plurality of structural blockers including the structural blocker, each structural blocker of the plurality of structural blockers aligned with an end of a respective cross member.

\* \* \* \* \*